Nov. 9, 1965 K. M. TRAMPEL 3,217,316
BINARY TO TERNARY CONVERTER
Filed Dec. 18, 1961
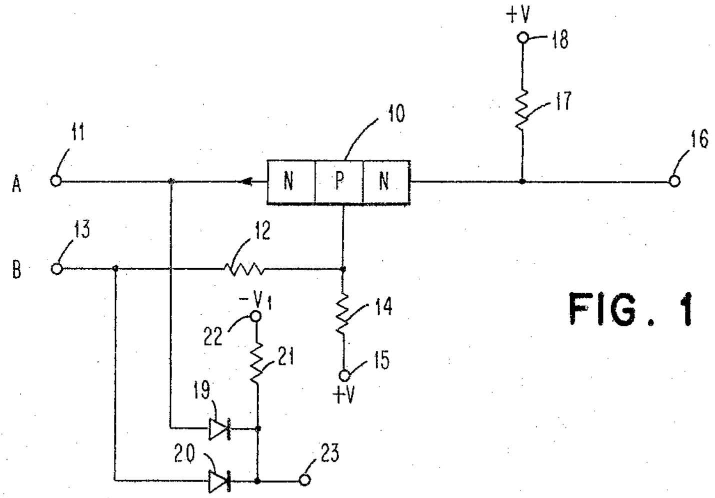
FIG. 1
FIG. 2
| INPUTS | | | | CONDUCTIVE STATE OF TRANSISTOR | OUTPUTS | |
|---|---|---|---|---|---|---|
| VOLTAGE LEVELS | | BINARY STATE | | | VOLTAGE LEVEL | TERNARY STATE |
| A | B | A | B | | | |
| GROUND | -V | 0 | 1 | OFF | +V | 1 |
| GROUND | GROUND | 0 | 0 | ON | GROUND | NOTHING |
| -V | GROUND | 1 | 0 | ON | -V | 0 |
| -V | -V | 1 | 1 | ON | -V (AT23) | ERROR |
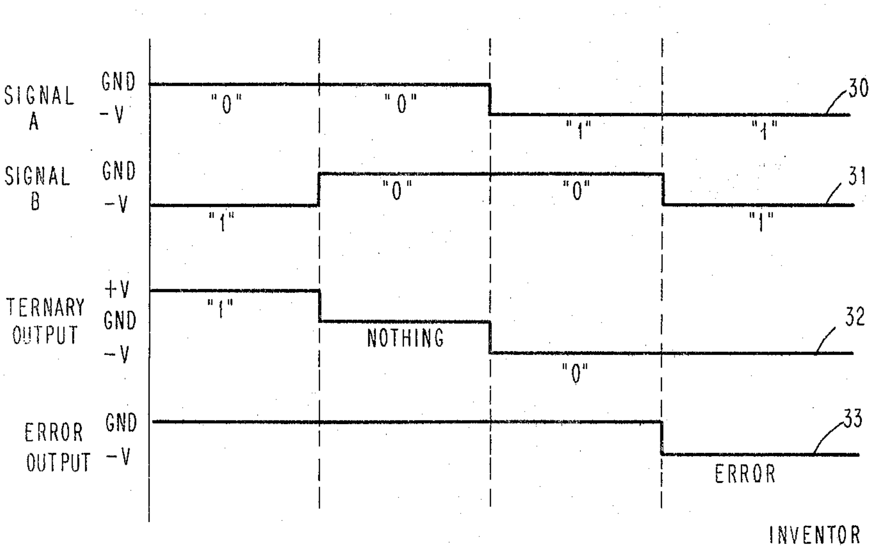
FIG. 3
INVENTOR
KURT M. TRAMPEL
BY John F. Ostendorf
ATTORNEY United States Patent Office 3,217,316
Patented Nov. 9, 1965

3,217,316

BINARY TO TERNARY CONVERTER

Kurt M. Trampel, Poughkeepsie, N.Y., assignor to International Business Machines Corporation, New York, N.Y., a corporation of New York Filed Dec. 18, 1961, Ser. No. 160,026
4 Claims. (Cl. 340—347)

This invention relates to switching circuits for digital computers and, more particularly, to a switching circuit for converting information codified in a binary manifestation into the corresponding information codified in a ternary manifestation.

In the development of present day digital computers, circuitry operable in response to ternary level signals is being employed in conjunction with conventional binary logic circuits in order to make optimum use of the added capabilities of a third level of logic. In making use of ternary logic circuits, a problem of signal level correspondence arises if the ternary circuits are required to accept input signals from binary circuits without converting the binary signal levels to ternary levels.

Accordingly, it is a primary object of the invention to provide a signal translating circuit for accomplishing the conversion of binary level signals into the corresponding ternary level signals. However, the invention is concerned, in a more specific manner, with converting two binary signals, each of which is carried on a separate line or rail, into the corresponding ternary signal.

As is well known in the art, two binary level signals are capable of producing four possible combinations of signals. Since only three of these combinations has a corresponding ternary signal level, it is, therefore, a more specific object of the invention to translate three combinations of double rail binary level signals into the corresponding ternary signals while detecting as an error the remaining signal combination which does not have a corresponding ternary signal.

A further object of the invention is to provide a circuit which changes logic of one polarity code to logic of the other polarity code in converting binary information to the corresponding ternary information.

In accordance with an aspect of the invention, there is provided a circuit for converting first and second binary input signals, each capable of residing at a first or second level, to a ternary output signal capable of residing at a corresponding first, second or third level. The circuit comprises an input circuit for supplying the binary coded input signals, current switching means, and an output circuit and a voltage supply of predetermined polarity coupled to the output of the switching means. The current switching means responds to the input signals to produce an output signal at the first ternary level when both of the binary input signals are at the first input level; at the second ternary level when the first binary signal is at the second level and the second binary signal is at the first level, and at the third ternary level, determined by the voltage supply of predetermined polarity, when the first binary signal is at the first level and the second binary signal is at the second level.

This circuit has the advantageous feature of requiring only one active signal translating device, such as a transistor, to act as the current switching means for accepting double rail binary information to provide the corresponding ternary information. Two of the three levels of the ternary information are determined by the level of one of the input signals, and, therefore, the circuitry associated with the signal translating device is substantially simplified.

A further feature of the invention is the provision of error indicating circuitry which is activated when the binary information at the input circuit is not codified according to a corresponding ternary code.

The foregoing and other objects, features and advantages of the invention will be apparent from the following more particular description of the preferred embodiments of the invention, as illustrated in the accompany drawing; wherein:

FIG. 1 is a circuit diagram of a circuit embodying the principles of the invention;

FIG. 2 is a table relating the input signal levels to the output signal levels and the corresponding code of these levels during the various conditions of operation of the signal translating device; and, FIG. 3 is a waveform diagram showing the levels of the output signals according to the various combinations of levels of the input signals.

Referring now to FIG. 1, the converter circuit of the invention comprises a signal translating device, such as an NPN transistor 10 connected at its emitter electrode to an input terminal 11 for receiving a binary input signal A. The base electrode of the transistor is coupled through a resistor 12 to a second input terminal 13 for receiving a binary input signal B. It is also coupled through a resistor 14 to a positive voltage supply +V connected to a terminal 15. A circuit output terminal 16 is coupled to the collector electrode of transistor 10 which is also connected through a resistor 17 to a +V voltage supply at the terminal 18. It is obvious, of course, that the voltage supplies at the terminals 15 and 18 can be the same supply thereby reducing the required circuitry for the transistor.

Referring to the table of FIG. 2, it will be apparent that there are four possible combinations of the binary input signals A and B. Logically, there combinations are: 10, 00, 01 and 11; the 0 state of each combination having a ground voltage level and the 1 state having a —V voltage level. As it is only necessary to employ three of these four combinations to obtain the corresponding ternary signals, the fourth combination, i.e., the 11 state, is employed to indicate the presence of an error in the system. Thus, any time that the 11 combination appears as the A and B input signals, an error indication is generated.

For this purpose, a simple OR circuit is provided including the conventional diodes 19 and 20 connected respectively to the input terminals 11 and 13 and in common through a resistor 21 to a voltage supply, for example, the —V1 supply at the terminal 22 which is, of course, at a more negative level than the —V level of either of the binary input signals A and B. The output terminal for this error indicating circuit is at 23.

Referring again to the table of Fig. 2 and as shown in the waveform diagram of Fig. 3, it is readily apparent that the 01, 00 and 10 combined binary states of the input signals have a corresponding ternary output state; the binary states being expressed in negative logic and the ternary states in positive logic. Thus, if it is considered that the input signals A and B (waveforms 30 and 31 in Fig. 3) are both at ground voltage level, i.e., 00 binary state, or if the A and B voltage levels are —V and ground, respectively, i.e., 10 binary state, the transistor 10 is rendered conductive since the resistors 12 and 14 shift the B input signal to a more positive level approaching the +V level at the terminal 15. Current is conducted from the supply at terminal 18 through the transistor to the terminal 11. Thus, the level of the ternary output signal 32 produced at the terminal 16 for these two binary input states is the level applied to the emitter electrode of the transistor 10. Similarly, if the A input signal is at ground voltage level and the B input signal is at —V voltage level, i.e., the binary state 01, the transistor is rendered nonconductive and the level of the ternary output signal 32 is determined by the +V voltage supply connected at the terminal 18.

When a —V voltage level occurs at both input terminals, the transistor is rendered conductive, since the resistors 12 and 14 shift the B input signal more positive and a —V level is provided at the terminal 16. Concurrently with this, however, the error circuit is activated to indicate the presence of this error condition by providing a —V level 33 at the terminal 23. When all the other binary signal combinations are applied at the input terminals 11 and 13, a signal approximating ground level is provided at terminal 23.

From the foregoing description, it is apparent that only one signal translating device is required as a current switch for the circuit to perform the conversion of double rail binary information to the corresponding ternary information. Consequently, any delays encountered in the circuit operation are minimal enabling the circuit to operate at high speeds.

Moreover, as previously stated, the conversion also entails a change from negative logic to positive logic; the conductivity type of the transistor 10 corresponding to the polarity of the logic. Thus, it is obvious, that the change of logic could be reversed simply by changing the conductivity type of the transistor to a PNP type and by making suitable polarity changes in the biasing arrangements for the electrodes of this transistor as well as an interchange in the levels of the input signals, so that one input signal level is at a +V level and a second input signal level is at ground level.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A converter of first and second input signals each being capable of residing at a first or second voltage level to an output signal capable of residing at a first, second or third voltage level, wherein said first and second levels of said output signal correspond substantially to said first and second levels respectively of said first input signal, comprising an input circuit for supplying said input signals, an output circuit for producing said output signal, a voltage supply of predetermined polarity, and current switching means connected to said input circuit, said output circuit and said voltage supply for responding to said input signals at the first level to produce the first level output signal, for responding to said first input signal at the second level and said second input signal at the first level to produce said second level output signal, and for responding to said first input signal at the first level and said second input signal at the second level to produce said third level output signal, said third level being determined by said voltage supply.

2. The converter of claim 1, and further comprising means for indicating the presence of an error in said circuit when said first and second input signals are at the second level.

3. A binary to ternary converter circuit of first and second input signals each being capable of residing at a first or second voltage level having one polarity code to an output signal capable of residing at a first, second or third voltage level having the opposite polarity code, wherein said first and second levels of said output signal correspond substantially to said first and second levels respectively of said first input signal, comprising an input circuit for supplying said input signals, a transistor having emitter, base and collector electrodes and having a conductivity type corresponding to the polarity code of the ternary output signal, an output circuit and a voltage supply coupled to the collector electrode of said transistor, said voltage supply having a polarity corresponding to the conductivity type of the transistor, said input circuit applying said first input signal directly to the emitter electrode only of said transistor and said input circuit applying said second input signal to said base electrode only of said transistor after its level is shifted toward the level of said voltage supply enabling said transistor to be rendered conductive when said first and second input signals are at the first level and when said first input signal is at said second level and the second input signal is at the first level thereby providing said output signal at first and second levels respectively, said transistor being rendered nonconductive when said first input signal is at the first level and said second input signal is at the second level providing the third level output signal at said output circuit determined by the value of said voltage supply.

4. The circuit of claim 3, and further comprising means for indicating the presence of an error in said circuit when said first and second input signals are at the second level.

References Cited by the Examiner

UNITED STATES PATENTS

| | | | |
|---|---|---|---|
| 2,850,647 | 9/58 | Fleisher | 307—88.5 |
| 2,879,411 | 3/59 | Faulkner | 307—88.5 |

MALCOLM A. MORRISON, *Primary Examiner.*

ARTHUR GAUSS, *Examiner.*